United States Patent
Roberts

(10) Patent No.: US 7,822,398 B2
(45) Date of Patent: Oct. 26, 2010

(54) DEVICE, SYSTEM, AND METHOD OF PHASED-ARRAY CALIBRATION

(75) Inventor: Richard D. Roberts, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 11/856,100

(22) Filed: Sep. 17, 2007

(65) Prior Publication Data

US 2009/0075615 A1    Mar. 19, 2009

(51) Int. Cl.
*H04B 1/06*    (2006.01)
*H04B 7/00*    (2006.01)

(52) U.S. Cl. .............. 455/277.1; 455/67.16; 455/276.1; 455/67.11

(58) Field of Classification Search ................ 455/66.1, 455/67.11, 67.16, 82, 562.1, 101, 121, 279.1, 455/233.1, 13.3, 24, 272, 277.1, 226.1, 278.1, 455/276.1, 273; 342/368, 174, 372, 159
See application file for complete search history.

(56) References Cited

U.S. PATENT DOCUMENTS

| | | | |
|---|---|---|---|
| 5,063,529 A * | 11/1991 | Chapoton | 342/174 |
| 5,530,449 A * | 6/1996 | Wachs et al. | 342/174 |
| 2004/0056799 A1* | 3/2004 | Sinsky et al. | 342/368 |
| 2006/0273959 A1* | 12/2006 | Kawasaki | 342/368 |
| 2008/0261534 A1* | 10/2008 | Wang et al. | 455/67.11 |

OTHER PUBLICATIONS

IEEE P802.11n/D0.01, Jan. 2006, IEEE P802.11n™/D0.01 Draft Amendment to Standard [FOR] Information Technology—Telecommunications and information exchange between systems-Local and Metropolitan networks-Specific requirements-Part 11: Wireless LAN Medium Access Control (MAC) and Physical Layer (PHY) specifications: Enhancements for Higher Throughput, Prepared by the 802.11 Working Group of the 802 Committee, pp. 1-191.

* cited by examiner

*Primary Examiner*—John Lee
(74) *Attorney, Agent, or Firm*—Shiloh et al.

(57) ABSTRACT

Device, system, and method of phased-array calibration. In some demonstrative embodiments, a wireless communication device may include an array of antenna elements; a calibration element located at a predefined location relative to the antenna elements; and an antenna controller capable of calibrating at least one beam forming weight of at least one antenna element of the array of antenna elements based on a detected phase of a calibration signal transmitted via one of the calibration element and the antenna element and received via another of the calibration element and the antenna element. Other embodiments are described and claimed.

13 Claims, 2 Drawing Sheets

DEVICE, SYSTEM, AND METHOD OF PHASED-ARRAY CALIBRATION

BACKGROUND

A wireless communication device may implement a phased-array antenna mechanism, e.g., in association with a wireless transmitter and/or wireless receiver. The phased-array antenna mechanism may include multiple antenna elements that are phased so as to achieve spatial combining at a certain "beam" angle. It is required that relative phases of the antenna element weights be calibrated, e.g., in a relative manner, for example, with a high degree of accuracy.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below

DETAILED DESCRIPTION

Figure 1:
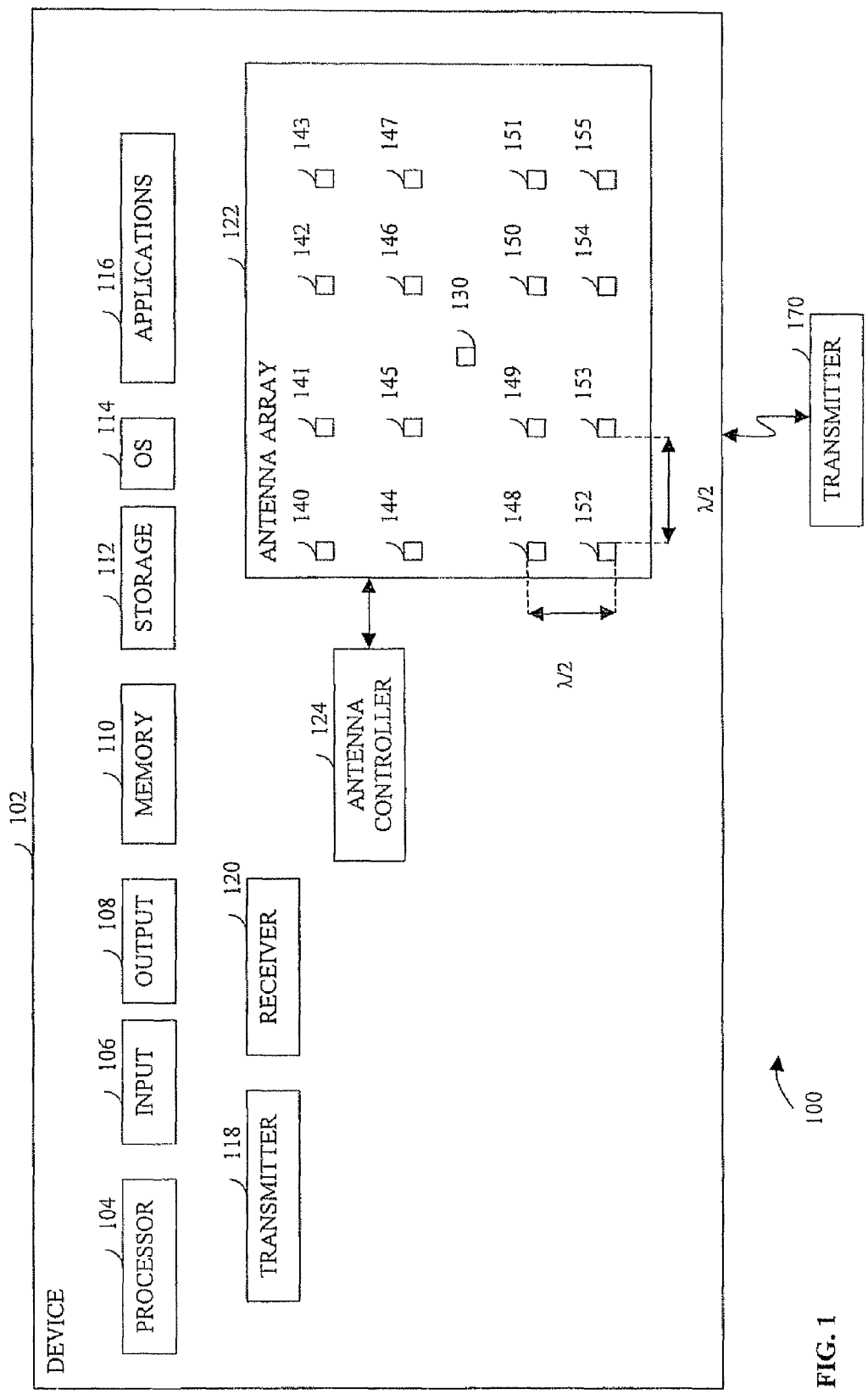
FIG. 1 is a schematic block diagram illustration of a wireless communication system in accordance with some demonstrative embodiments.

In the following detailed description, numerous specific details are set forth in order to provide a thorough understanding of some embodiments. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing Institute-of-Electrical-and-Electronics-Engineers (IEEE) 802.15, IEEE 802.15.3c, WirelessHD (WiHD), and/or Ecma TG20 standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth, Global Positioning System (GPS), Wi-Fi, Wi-Max, ZigBee™, Wi-HD, Ultra-Wideband (UWB), Global System for Mobile communication (GSM), 2G, 2.5G, 3G, 3.5G, or the like. Some embodiments may be used in various other devices, systems and/or networks.

FIG. 1 schematically illustrates a block diagram of a wireless communication system 100 in accordance with some demonstrative embodiments. System 100 may include, for example, a wireless communication device 102 able to communicate with at least one other communication device 170, e.g., a wireless Access Point (AP), a wireless base station, a wireless communication device, a wireless communication station, or the like.

Device 102 may be or may include, for example, a mobile phone, a cellular phone, a handheld device, a computing device, a computer, a PC, a server computer, a client/server system, a desktop computer, a mobile computer, a portable computer, a laptop computer, a notebook computer, a tablet computer, a network of multiple interconnected devices, a handheld computer, a handheld device, a PDA device, a handheld PDA device, an on-board device, an off-board device, a hybrid device, a vehicular device, a non-vehicular device, a mobile or portable device, a non-mobile or non-portable device, or the like.

Device 102 may include, for example, a processor 104, an input unit 106, an output unit 108, a memory unit 110, a storage unit 112, a transmitter 118, and/or a receiver 120.

Device 102 may optionally include other suitable hardware components and/or software components.

Processor 104 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 104 executes instructions, for example, of an Operating System (OS) 114 of device 102 or of one or more applications 116.

Input unit 106 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a plasma display unit, one or more audio speakers, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a Digital Versatile Disk (DVD) drive, or other suitable removable or non-removable storage units. Memory unit 110 and/or storage unit 112, for example, store data processed by device 102.

Device 102 may include an antenna array 122 associated with transmitter 118 and/or receiver 120. For example, transmitter 118 may transmit via array 122 wireless RF signals, blocks, flames, transmission streams, packets, messages and/or data, e.g., to device 170; and/or receiver 120 may receive via array 122 wireless RF signals, blocks, frames, transmission streams, packets, messages and/or data, e.g., from device 170, transmitter 118 may include, for example, any suitable RE transmitter; and/or receiver 120 may include any suitable RE receiver. Optionally, transmitter 118 and receiver 120 may be implemented using a transceiver, a transmitter-receiver, or other suitable component. In some embodiments, antenna array 122 may be implemented as part of receiver 118 and/or transmitter 120. In other embodiments, antenna array may be implemented as a separate element of device 102.

In some embodiments, some or all of the components of device 102 may be enclosed in a common housing, packaging, or the like, and may be interconnected or operably associated using one or more wired or wireless links. In other embodiments, components of device 102 may be distributed among multiple or separate devices or locations.

In some demonstrative embodiments, antenna array 122 may include an array of antenna elements, e g., including sixteen antenna elements 140, 141, 142, 143, 144, 145, 146, 147, 148, 149, 150, 151, 152, 153, 154, and 155. In one example, the array of elements may be arranged in a plurality of columns and rows. For example, antenna elements 140, 141, 142, 143, 144, 145, 146, 147, 148, 149, 150, 151, 152, 153, and 154 may be arranged in four rows and four columns. In one example, antenna elements 140, 141, 142, 143, 144, 145, 146, 147, 148, 149, 150, 151, 152, 153, and 154 may be arranged at an equal distance, denoted 122, from one another. In other embodiments, the antenna elements of array 122 may be arranged in any other suitable arrangement, e.g., at equal and/or different distances.

In some demonstrative embodiments, device 102 may also include a calibration element 130 located at a predefined location relative to the antenna elements of array 122, e g., within array 122. In one example, calibration element 130 may be located substantially at the center of array 122. In other embodiments, calibration element 130 may be located at any other suitable location relative to array 122.

In some demonstrative embodiments, device 102 may also include an antenna controller 124 capable of calibrating at least one beam forming weight of at least one antenna element (the "calibrated antenna element") of array 122 based on a detected phase of a calibration signal transmitted via one of calibration element 130 and the calibrated antenna element, and received via another of calibration element 130 and the calibrated antenna element, e.g., as described in detail below. The calibration signal may include, for example, an RF tone, e.g., in the form of a sine wave, having a predefined frequency, e.g., within a RF bandwidth of array 122. For example, the calibration signal may include a 60 Gigahertz (GHz) frequency tone, and/or any other suitable RF signal, tone or the like.

In some demonstrative embodiments, calibration element 130 may transmit one or more calibration signals, e.g., in order to calibrate one or more antenna elements of array 122 at a receive mode of operations. For example, antenna controller 124 may calibrate a reception beam forming weight of the calibrated antenna element according to a detected phase of the calibration signal transmitted via element 130 and received at the calibrated antenna element, e.g., as described in detail below.

In some demonstrative embodiments, antenna controller 124 may calibrate a plurality of reception beam forming weights of a plurality of antenna elements of array 122, e.g., antenna elements 140, 141, 142, 143, 144, 145, 146, 147, 148, 149, 150, 151, 152, 153, and 154, respectively, based on a plurality of detected phases of the calibration signal transmitted via calibration element 130 and received at the plurality of antenna elements, respectively. For example, a plurality of antenna elements of array 122, e.g., each antenna element of array 122, may be sequentially activated to detect the calibration signal emitted by calibration element 130. Antenna controller 124 may calibrate a plurality of reception beam forming weights of the plurality of antenna elements, respectively, based, for example, on the plurality of detected phases of the calibration signal at the plurality of antenna elements, respectively, e.g., as described below.

In some demonstrative embodiments, calibration element 130 may receive one or more calibration signals, which may be transmitted via one or more antenna elements of array 122, e.g., in order to calibrate the one or more antenna elements of array 122 at a transmit mode of operation. For example, antenna controller 124 may calibrate a transmission beam forming weight of the calibrated antenna element according to a detected phase of the calibration signal transmitted via the calibrated antenna element and received at calibration element 130, e.g., as described in detail below.

In some demonstrative embodiments, a plurality of antenna elements of array 122, e.g., each of antenna elements 140, 141, 142, 143, 144, 145, 146, 147, 148, 149, 150, 151, 152, 153, and 154, may sequentially transmit a plurality of calibration signals, respectively; and antenna controller 124 may calibrate a plurality of transmission beam forming weights of the plurality of antenna elements, respectively, based on a plurality of detected phases of the plurality of calibration signals, respectively, e.g., as described below.

In some demonstrative embodiments, antenna controller 124 may calibrate the beam forming weight of the calibrated antenna element based on a difference between the detected phase of the calibration signal and an expected phase of the calibration signal. For example, antenna controller 124 may calibrate the reception beam forming weight of the calibrated antenna element based on a difference between the detected phase of the calibration signal at the calibrated antenna element, and an expected phase of the calibration signal between calibration element 130 and the calibrated antenna element. Antenna controller 124 may calibrate, for example, the transmission beam forming weight of the calibrated antenna element based on a difference between the detected phase of the calibration signal at the calibration element, and an expected phase of the calibration signal between calibration element 130 and the calibrated antenna element.

In some demonstrative embodiments, the expected phase may be based, for example, on a distance between calibration element 130 and the calibrated antenna element, egg, as described below.

In some demonstrative embodiments, the distance, denoted $d_{n,m}$, between calibration element 130 and an antenna element, denoted $a_{n,m}$, located at all n-th row and an m-th column of array 122, egg, $\{n=-2, -1, 0, 1, 2\}$ and $\{m=-2, -1, 0, 1, 2\}$, may be determined, for example, as follows:

$$d_{n,m} = \sqrt{\frac{\lambda^2 (2 \cdot |n| - 1)^2}{4} + \frac{\lambda^2 (2 \cdot |m| - 1)^2}{4}} \quad (1)$$

In some demonstrative embodiments, the frequency, denoted F, of the calibration signal may be related to the value of $\lambda$ and to a propagation velocity of the calibration signal. For example, the frequency F may be related to the value of $\lambda$ as follows:

$$\lambda = c/F \quad (2)$$

wherein c denotes the speed of light, and the frequency F is expressed in Hertz.

In some demonstrative embodiments, the expected phase, denoted $p_{n,m}$, in radians of the calibration signal between the antenna element $a_{n,m}$ and calibration element 130 may be determined, for example, as follows:

$$p_{n,m} = e^{-j2\pi F \cdot \tau_{n,m}} \quad (3)$$

wherein:

$$\tau_{n,m} = d_{n,m} \cdot c$$

The expected phase $p_{n,m}$ of the antenna element $a_{n,m}$ in the reception mode of operation may be equal to the expected phase $p_{n,m}$ of the antenna element $a_{n,m}$ in the transmission mode of operation. The expected phase of the calibrated antenna, erg., to be used to determine the transmission beam forming weight and/or the reception beam forming weight of the calibrated antenna element, may be determined using Equation 3.

In some demonstrative embodiments, antenna controller 124 may calibrate the beam forming weight of the calibrated antenna based on a reference beam forming weight of a reference antenna element of antenna array 122. For example, the reference antenna may be selected, e.g., arbitrarily, from antenna elements 140, 141, 142, 143, 144, 145, 146, 147, 148, 149, 150, 151, 152, 153, 154, and 155. In one example, antenna 140 may be selected as the reference antenna. Antenna controller 124 may calibrate the beam forming weights of one or more antenna elements of array 122, e.g., each of the plurality of antenna elements other than the reference element, such that a phase difference between the calibrated antenna element and the reference antenna element is a predefined differential value, e.g., +10 degrees, or any other value.

Figure 2:
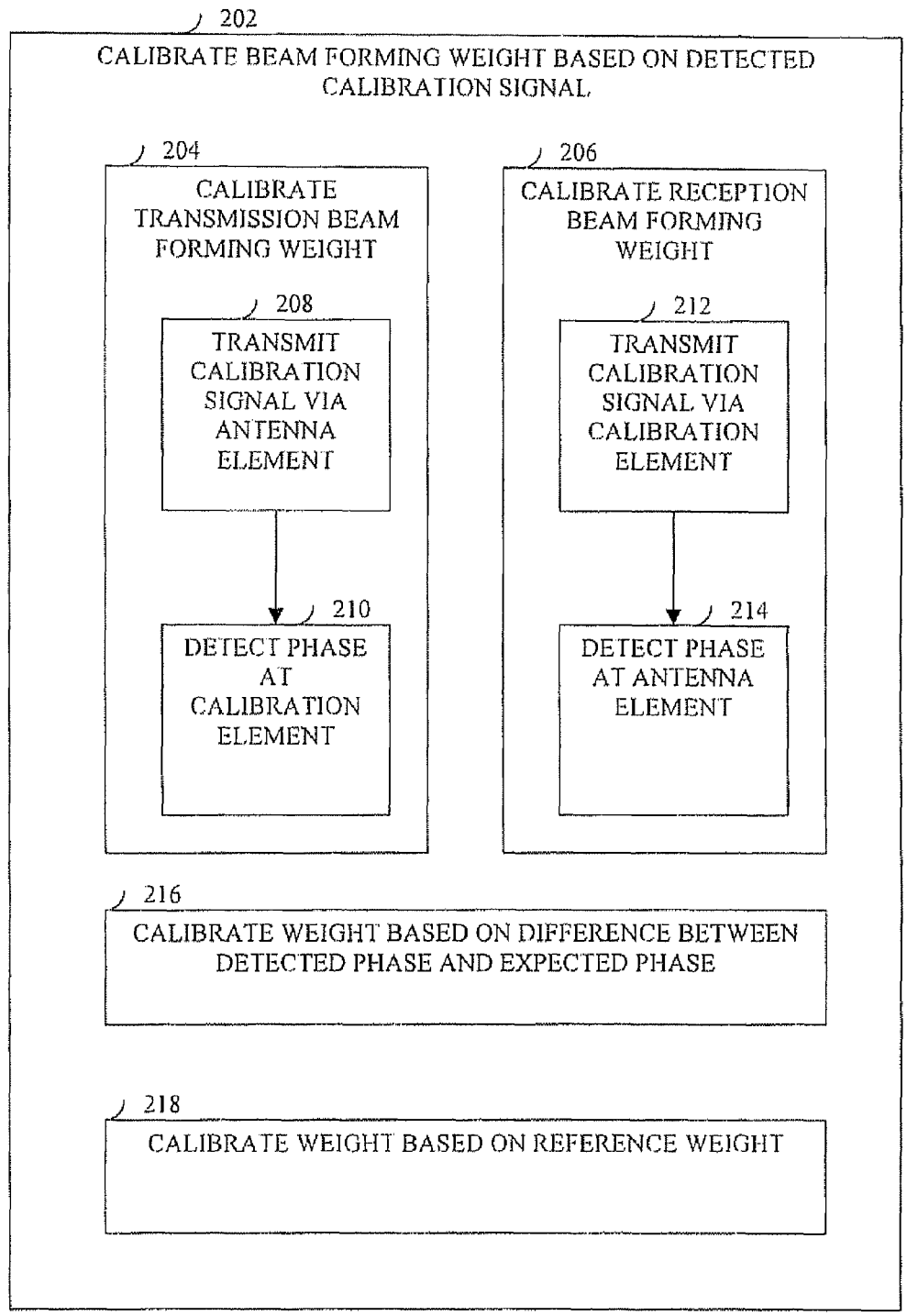
FIG. 2 is a schematic flow-chart illustration of a method of phased-array calibration in accordance with some demonstrative embodiments.

Reference is now made to FIG. 2, which schematically illustrates a method of phased-array calibration in accordance with some demonstrative embodiments. Although embodiments of the invention are not limited in this respect, one or more operation of the method of FIG. 2 may be implemented by device 102 (FIG. 1), antenna controller 124 (FIG. 1), calibration element 130 (FIG. 1), and/or one or more antenna elements of antenna array 122 (FIG. 1), for example, in order to calibrate transmission beam forming weight and/or a reception beam forming weight of one or more antenna elements of antenna array 122 (FIG. 1), e.g., prior to using device 102 (FIG. 1) to transmit and/or receive a wireless transmission.

As indicated at block 202, the method may include calibrating at least one beam forming weight of at least one antenna element of an array of antenna elements based on a detected phase of a calibration signal transmitted via one of a calibration element and the antenna element, and received via another of the calibration element and the antenna element. For example, antenna controller 124 (FIG. 1) may calibrate at least one bean forming weight of at least one of antenna elements 140, 141, 142, 143, 144, 145, 146, 147, 148, 149, 150, 151, 152, 153, 154, and 155, based on a calibration signal transmitted via one of calibration element 130 (FIG. 1) and the antenna element, and received via another of calibration element 130 and the antenna element, e.g., as described above.

As indicated at block 206, calibrating the at least one beam forming weight may include calibrating a reception beam forming weight of the antenna element. For example, antenna controller 124 (FIG. 1) may calibrate a reception beam forming weight of an antenna element of array 122 (FIG. 1)

As indicated at block 212, calibrating the reception beam forming weight of the antenna element may include transmitting the calibration signal via the calibration element. For example, calibration element 130 (FIG. 1) may emit an RF signal within a frequency band to be used by receiver 120 (FIG. 1). In one example, calibration element 130 may emit an RF tone at a predefined frequency, e.g., substantially exactly at a frequency of 60 GHz.

As indicated at block 214, calibrating the reception beam forming weight of the antenna element may also include detecting a phase of the calibration signal at the antenna element, and calibrating the reception beam forming weight of the antenna element based on the detected phase of the calibration signal at the antenna elements. In one example, a plurality of antenna elements of array 122 (FIG. 1), e.g., each antenna element of array 122 (FIG. 1), may be sequentially activated to detect the calibration signal emitted by calibration element 130 (FIG. 1). Antenna controller 124 (FIG. 1) may calibrate a plurality of reception beam forming weights of the plurality of antenna elements, respectively, based, for example, on the plurality of detected phase of the calibration signal at the plurality of antenna elements, respectively.

As indicated at block 204, calibrating the at least one beam forming weight may include calibrating a transmission beam forming weight of the antenna element. For example, antenna controller 124 (FIG. 1) may calibrate a transmission beam forming weight of an antenna element of array 122 (FIG. 1).

As indicated at block 208, calibrating the transmission beam forming weight of the antenna element may include transmitting the calibration signal via the antenna element.

For example, the antenna element may emit an RF signal within a frequency band to be used by transmitter 118 (FIG. 1). In one example, the calibration signal may include a RF tone at a predefined frequency, e.g., substantially exactly at a frequency of 60 GHz. In one example, the calibration signal may be transmitted, e.g., sequentially, via a plurality of antenna elements of array 122 (FIG. 1), e.g., each antenna element of array 122 (FIG. 1), e.g., as described above.

As indicated at block 210, calibrating the transmission beam forming weight of the antenna element may also include detecting a phase of the calibration signal at the calibration element, and calibrating the transmission beam forming weight of the antenna element based on the detected phase of the calibration signal at the calibration elements. For example, antenna controller 124 (FIG. 1) may calibrate a plurality of transmission beam forming weights of the plurality of antenna elements, respectively, based for example, on the plurality of detected phases of the calibration signal at the calibration element, respectively.

As indicated at block 216, calibrating the at least one beam forming weight may also include calibrating the beam forming weight based on a difference between the detected phase and an expected phase of the calibration signal. For example, the expected phase may be based on a distance between the calibration element and the antenna element, e.g., according to Equation 3, as described above with reference to FIG. 1.

As indicated at block 218, calibrating the beam forming weight of the antenna element may include calibrating the beam forming weight based on a reference beam forming weight of a reference antenna element of the array of antenna elements. For example, antenna controller 124 (FIG. 1) may calibrate the beam forming weight of the antenna element based on a reference beam forming weight of a selected antenna element of antenna elements 140, 141, 142, 143, 144, 145, 146, 147, 148, 149, 150, 151, 152, 153, 154, and 155 (FIG. 1).

Other suitable operations may be used, and other suitable orders of operation may be used.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a RAM, a ROM, a rigid magnetic disk, and an optical disk. Some demonstrative examples of optical disks include CD-ROM, CD-R/W, and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
an array of antenna elements;
a calibration element located within the array of antenna elements; and
an antenna controller capable of calibrating at least one reception beam forming weight of at least one antenna element of said array of antenna elements based on a detected phase of a calibration signal transmitted via said calibration element and received via said antenna element,
wherein said controller is capable of calibrating said reception beam forming weight based on a reference reception beam forming weight of a reference antenna element of said array of antenna elements.

2. The wireless communication device of claim 1, wherein said at least one antenna element comprises a plurality of antenna elements, and
wherein said antenna controller is capable of calibrating a plurality of reception beam forming weights of said plurality of antenna elements, respectively, based on a plurality of detected phases of said calibration signal, respectively.

3. The wireless communication device of claim 1, wherein said plurality of antenna elements comprises all antenna elements of the array of antenna elements.

4. The wireless communication device of claim 1, wherein said antenna controller is capable of calibrating at least one transmission beam forming weight of said at least one antenna element based on a detected phase of a calibration signal transmitted via said antenna element and received via said calibration element.

5. The wireless communication device of claim 4, wherein said at least one antenna element comprises a plurality of antenna elements capable of sequentially transmitting a plurality of calibration signals, respectively, and
wherein said antenna controller is capable of calibrating a plurality of transmission beam forming weights of said plurality of antenna elements, respectively, based on a plurality of detected phases of said plurality of calibration signals, respectively.

6. The wireless communication device of claim 1, wherein said antenna controller is capable of calibrating said reception beam forming weight based on a difference between said detected phase and an expected phase of said calibration signal, and wherein said expected phase is based on a distance between said calibration element and said antenna element.

7. The wireless communication device of claim 1, wherein said calibration element is located at a center of said array.

8. The wireless communication device of claim 1, wherein said calibration signal comprises a radio-frequency tone having a predefined frequency.

9. A method comprising:
   transmitting at least one calibration signal via at least one antenna element of an array of antenna elements;
   receiving said at least one calibration signal via a calibration element located within the array of antenna elements; and
   calibrating a transmission beam forming weight of said antenna element based on a detected phase of the calibration signal at said calibration element,
   wherein calibrating said transmission beam forming weight comprises calibrating said transmission beam forming weight based on a difference between said detected phase and an expected phase of said calibration signal, and wherein said expected phase is based on a distance between said calibration element and said antenna element.

10. The method of claim 9 comprising performing said transmitting, receiving and calibrating for each antenna element of said array of antenna elements.

11. The method of claim 9 comprising:
   transmitting another calibration signal via said calibration element;
   receiving the other calibration signal via said antenna element; and
   calibrating a reception beam forming weight of said antenna element based on a detected phase of the other calibration signal at said antenna element.

12. The method of claim 9, wherein calibrating said transmission beam forming weight comprises calibrating said transmission beam forming weight based on a reference transmission beam forming weight of a reference antenna element of said array of antenna elements.

13. The method of claim 9, wherein said calibration signal comprises a radio-frequency tone having a predefined frequency.

* * * * *